US009602556B1

(12) United States Patent
Cham

(10) Patent No.: US 9,602,556 B1
(45) Date of Patent: Mar. 21, 2017

(54) PACKETCABLE CONTROLLER FOR VOICE OVER IP NETWORK

(71) Applicant: CSC Holdings, LLC, Bethpage, NY (US)

(72) Inventor: Dev Cham, New Providence, NJ (US)

(73) Assignee: CSC HOLDINGS, LLC, Bethpage, NY (US)

( * ) Notice: Subject to any disclaimer, the term of this patent is extended or adjusted under 35 U.S.C. 154(b) by 86 days.

(21) Appl. No.: 13/837,419

(22) Filed: Mar. 15, 2013

(51) Int. Cl.
| H04J 3/22 | (2006.01) |
| H04L 12/66 | (2006.01) |
| G06F 15/16 | (2006.01) |
| G06F 11/00 | (2006.01) |
| H04L 29/06 | (2006.01) |

(52) U.S. Cl.
CPC .................... H04L 65/40 (2013.01)

(58) Field of Classification Search
CPC . H04L 65/1069; H04L 69/24; H04L 65/1006; H04L 29/06027; H04L 65/80; H04L 65/04; H04W 4/00
USPC ........................................................ 370/352
See application file for complete search history.

(56) References Cited

U.S. PATENT DOCUMENTS

| 6,839,342 | B1 * | 1/2005 | Parham et al. ............... 370/352 |
| 7,103,067 | B1 * | 9/2006 | Singh ................ H04L 29/06027 370/353 |
| 7,254,643 | B1 * | 8/2007 | Peters, Jr. ........... H04L 29/1216 709/227 |
| 7,643,474 | B2 * | 1/2010 | Huang ................ H04L 65/1016 370/352 |
| 8,730,943 | B1 * | 5/2014 | Sin et al. ...................... 370/352 |
| 2007/0211695 | A1 * | 9/2007 | Shi .......................... H04L 12/66 370/352 |
| 2007/0259651 | A1 * | 11/2007 | Bae et al. .................. 455/412.1 |
| 2007/0274462 | A1 * | 11/2007 | Wu ............................... 379/37 |
| 2008/0056242 | A1 * | 3/2008 | Hersent ............... H04M 7/1205 370/352 |
| 2012/0320736 | A1 * | 12/2012 | Hillier ................. H04M 3/2263 370/218 |

* cited by examiner

Primary Examiner — Edan Orgad
Assistant Examiner — Vanneilian Lalchinthang
(74) Attorney, Agent, or Firm — Sterne, Kessler, Goldstein and Fox P.L.L.C.

(57) ABSTRACT

Disclosed herein are system, method, and computer program product embodiments for an access gateway control function server to convert between network-based call signaling messages and session initiation protocol messages. An embodiment operates by receiving in a first access gateway control function server, a first session initiation protocol (SIP) message sent from a first device and converting the SIP message in the first access gateway control function server to a first network-based call signaling (NCS) message to be received by a second device.

18 Claims, 6 Drawing Sheets

PACKETCABLE CONTROLLER FOR VOICE OVER IP NETWORK

BACKGROUND

Field

Embodiments relate to a PacketCable controller for a voice over IP (VoIP) network.

Background

The IP Multimedia Subsystem (IMS) is a networking architecture that provides both mobile and fixed multimedia services. IMS delivers IP multimedia services and is being integrated with current telephone and internet services that are provided by service providers. Currently, network providers provide services using PacketCable network-based call signaling (NCS) legacy devices such as multimedia terminal adapters or embedded multimedia terminal adapters. IMS is based on session initiation protocol (SIP). Thus, network providers seeking to provide IMS networking solutions are in need of a way to convert between NCS and SIP.

What is needed is a system and method for providing an access gateway control function.

BRIEF SUMMARY

Embodiments herein describe methods and systems for providing access gateway control functions. In particular, the access gateway control function operates to convert NCS to SIP and SIP to NCS while maintaining VoIP (voice over IP) feature parity with a TAS (telephony application server) in a core network. The TAS is responsible for controlling and servicing all voice calling features.

According to some embodiments, a method includes beginning a call session between a first device and a second device. Next, the method includes receiving in a first access gateway control function server, a first session initiation protocol (SIP) message sent from the first device and converting the SIP message in the first access gateway control function server to a first network-based call signaling (NCS) message to be received by the second device. Then, the call session ends between the first device and the second device.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Network Environment

Figure 1:
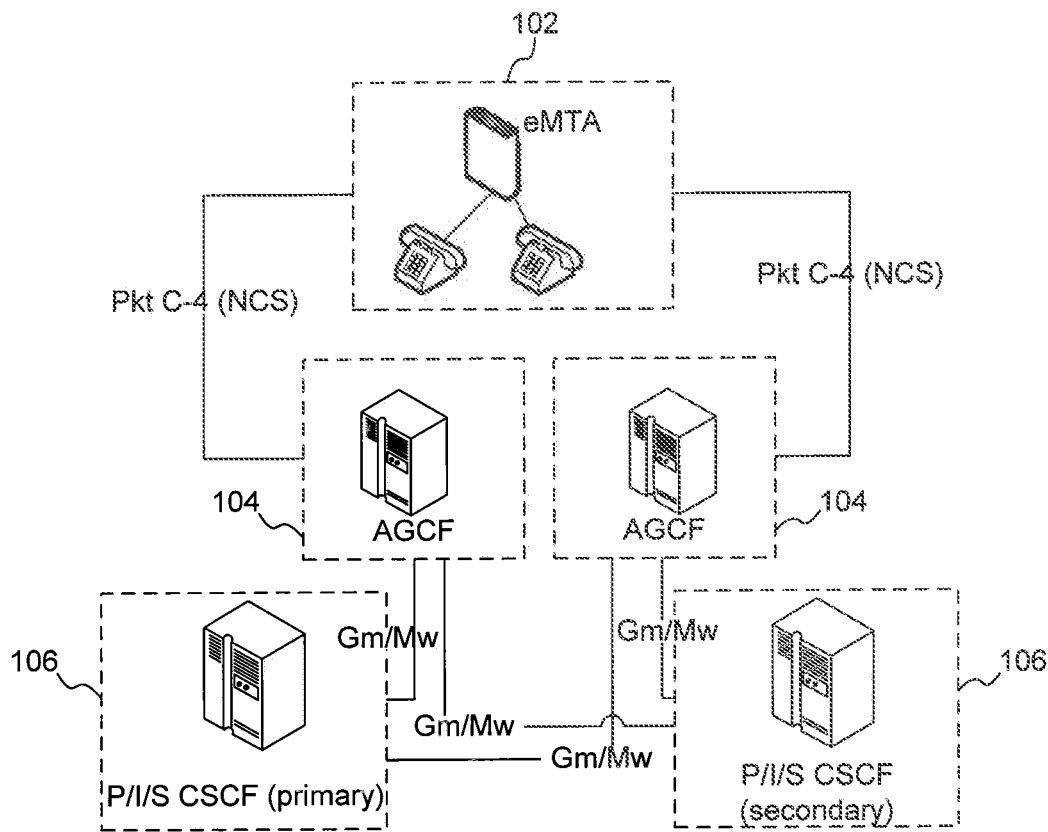
FIG. 1 illustrates network hardware associated with an access gateway control function (AGCF) according to example embodiments.

FIG. 1 is a network diagram providing an access gateway control function (AGCF) according to example embodiments. A media terminal adapter such as MTA 102 is shown as being connected to a phone line at a subscriber's location. As shown in FIG. 1, the MTA is an embedded MTA such as a cable modem and telephone adapter (eMTA). This MTA 102 is connected to an access gateway control function server 104. The AGCF 104 is connected at a provider end to a proxy/interrogating/serving call session control function (P/I/S-CSCF) server 106. As shown in FIG. 1, one of the P/I/S-CSCF servers is a primary device and another of the P/I/S-CSCF servers is a secondary device.

According to embodiments, the AGCF 104 manages the conversion of subscriber signaling between NCS and SIP. The NCS subscriber may appear to the IMS network core as IMS SIP user equipment connecting to the P/I/S-CSCF 106 through the AGCF 104.

The AGCF 104 includes logic capable of converting information received in a SIP message from the IMS network core into a service that is presentable to analog lines such as an NCS signal. In addition, the AGCF 104 is also capable of converting an NCS signal into a SIP message. As an example, an off-hook event that is provided from customer-premises equipment (CPE) such as a terminal including an embedded media terminal adapter, a media terminal adapter, a cable modem, etc. is sent to the AGCF 104 which causes the CPE to play a dial tone. CPE may include equipment which complies with PacketCable 1.0/1.5 within a NCS network. One or more analog devices may be connected to a cable modem which provides analog services to multiple lines on a single CPE device. The AGCF 104 is to provide functionality of a media gateway controller (MGC) by providing signaling and call control protocol toward the NCS interface. In addition, the AGCF 104 is to provide an interface with the IMS core by meeting interface requirements between the AGCF 104 and the proxy/interrogating/serving call session control function (P/I/S-CSCF) server 106. The AGCF 104 emulates the P-CSCF and will send registrations to the I-CSCF and session control signaling to the S-CSCF on behalf of NCS endpoints.

The AGCF 104 may support the implementation of Gm interface requirements between the AGCF 104 and the P-CSCF. The AGCF is to emulate user equipment and will send registrations as well as control signaling to the P-CSCF on behalf of NCS endpoints.

The AGCF 104 may be capable of mapping an identity of an analog access line ID to a corresponding address of record/IP multimedia public identity (IMPU). There may be multiple IMPUs per endpoint, such as an embedded multimedia terminal adapter, a multimedia terminal adapter, a cable modem, etc.

The AGCF 104 may act as a call management server (CMS) and become part of the trusted domain within the IMS network by employing secure network level policies for all controlled sessions.

The AGCF 104 manages session description protocol (SDP) for specifying and negotiating media streams to be transmitted in a call session as well as real-time transport protocol for framing of media streams on both NCS and SIP. However, real-time transport protocol stream does not flow through the access gateway control function and is directly connected to an endpoint.

AGCF Standards Compliance Requirements

The AGCF 104 complies with a number of standards including PacketCable IMS specifications, PacketCable IMS SIP and SDP specifications. In addition, the AGCF 104 supports 3G security as well as access security for IP-based services and SIP signaling. The AGCF 104 is to be compliant with PacketCable residential SIP telephony and support DECT NCS. The AGCF 104 may support interworking with the I-CSCF. Along with mandatory SIP registration headers, some headers may be used in order integrate with AGCF and I-CSCF which may include P-Visited-Network-ID, P-Charging-Vector, Authorization, and Path. For the P-Visited-Network-ID header, I-CSCF allows this header to populate the Visited-Network-Identifier AVP in the Cx UAR sent to the HSS. This AVP is used by the HSS to authorize user registration and may be populated with a home network ID assuming that the AGCF is at home. The P-Charging-Vector header is related to charging. The authorization header is included and the AGCF includes a user-name parameter which includes SIP Private ID and matches one provisioned in the subscriber database, e.g., HSS (home subscriber server), which authorizes user credentials as part of SIP registration. According to example embodiments, Path is another optional header which may allow further functionality. For instance, using the Path header, PS CSCF may identify a return communication address for the registered user.

AGCF Registration Requirements

The AGCF 104 may be compliant with and support standard SIP registrations, de-registrations and re-registrations on behalf of each subscriber gateway line or group of lines. The AGCF establishes an active registration status with the IMS for access to voice services. In the initial register request to the IMS the user equipment is to set "To" and "From" headers to SIP URI Public User ID (PUID) to be registered, a "Contact" header to the user equipment's content address, "expires" to a value such as 3600 seconds for the IMS default, Request-URI to SIP URI home network domain, and the "Route" header to P-CSCF domain name/IP address.

When the cable modem, multimedia terminal adapter or embedded multimedia terminal adapter is powered on, the AGCF 104 registers each subscriber gateway line to the IMS network according to their address of record IMS identifiers. The registered user information includes public and/or private identities as well as user credentials.

The AGCF 104 performs registration of each endpoint line toward the IMS core upon successful registration of the endpoint line on the NCS interface. In addition, the AGCF 104 may be capable of one-to-one mapping between a line side endpoint for NCS leg to a corresponding IMPI+MPU for a SIP leg to IMS core.

Upon initiation of registration, if there are multiple lines associated with an embedded multimedia terminal adapter, multiple registrations may be generated by the AGCF 104, one for each line. The AGCF 104 may maintain registration instances for separate line ids. The AGCF 104 may bind an endpoint line ID with one or more public user identities (e.g. published telephone numbers and IMPUs) and may be a private user identity (IMPI).

According to embodiments, the AGCF 104 may perform auto-registration on behalf of NCS users. The IMS CSCF requires the registration of users as well as regular re-registration to be performed in order to confirm current status.

The AGCF 104 may support periodic registration refresh transactions per subscriber gateway line. The AGCF 104 may commence re-registration at half of the time duration if the timer is less than 1200 second or 600 seconds prior to timer expiration if the negotiated time is greater than 1200 seconds.

AGCF 104 may support re-registration signaling optimization toward the IMS core. The AGCF 104 may carry an "Authorization" header that is received during an initial registration challenge in the re-register message from the AGCF 104 sent to the IMS core. Thus, according to example embodiments, the S-CSCF need not challenge each re-registration.

The AGCF 104 may withstand a registration overload at the IMS core. An overloaded CSCF may generate a 503 "Service Unavailable" or a 500 "Internal Error" response to a registration request and may include a "Retry-After" header field that indicates how long the AGCF 104 is to wait before re-attempting to send a register request to the same CSCF for the particular subscriber line.

After the AGCF 104 receives a 503 response, the AGCF 104 is to support the "Retry-After" header field. If the "Retry-After" header field is 32 seconds or less, the AGCF 104 waits the requested time and then retries the request. However, if the value of the "Retry-After" is larger than 32 seconds, the AGCF 104 may try an alternate CSCF. If an alternate CSCF may be successfully reached and registration is successful, the AGCF 104 may discard the "Retry-After" value from the original request. However, if the AGCF 104 may not reach another CSCF, the AGCF 104 is to reattempt registration after the "Retry-After" interval. This "Retry-After" interval assists in flooding registration requests by deferring and spreading out registration re-attempts.

The AGCF 104 may support public globally routable user-agent URI (GRUU). This may assist in determining the origination of a 911 call.

According to embodiments, SIP provisioned entities on an AGCF 104 may not require SIP authentication which may be by-passed if security measurements are applied at the IP level.

AGCF MTA Audit Requirements

According to example embodiments, the AGCF 104 may continuously audit NCS endpoints and audit for all NCS lines which are connected using a media gateway control protocol message. For example, a MGCP message may include:

Media Gateway Control Protocol
AUEP (AuditEndpoint)
Transaction ID: 71487511
Endpoint: aaln/1@v001dcdede9a1.voip.eng.cv.net
Version: MGCP 1.0 NCS 1.0

Thus, a continuous audit may be performed on a round-robin basis by going through all lines sequentially, or a parallel check may be used based on a "line audit" timer which enables a continuous check against the line. The time for a round-robin audit scheme may vary depending upon a number of lines on the AGCF switch.

An eMTA may include multiple lines and the AGCF 104 may perform audit endpoint against each of the lines. AGCF auditing may be enabled or disabled for each MTA or subscriber gateway access line.

In addition, the AGCF 104 may be able to match a current MGC implementation. The AGCF 104 may be configured to audit at peak (17:00) and off-peak times (02:00). At peak hours, the AGCF 104 may query each endpoint by querying an endpoint one second at a time. All endpoints may be cycled through, and then the query may repeat. During off peak hours the AGCF 104 may delay queries by 250 ms. Thus, according to example embodiments, even if a line is blocked and unreachable, the AGCF 104 may be able to audit the line. A minimum audit time value may prevent audit checks from being too frequent and this value may be configurable.

If an audit failure is detected, the AGCF 104 may frequently audit the line using back-off timers (2 seconds, 4 seconds, 8 seconds, etc.) up to a maximum back-off timer. At this point, the associated subscriber gateway line may be marked as being inoperable. A maximum back-off timer may be set as 30 thirty seconds and this may be a configurable value. After the back-off timer expires, the AGCF 104 may de-register a respective subscriber line by sending a de-registration message to the IMS core. According to an example embodiment, as an option, AGCF 104 may maintain registration toward the IMS core, regardless of NCS connectivity state.

The AGCF 104 may generate specific alarms based on audit results. The values for the alarms may be critical, major, minor, etc. "Critical," "major" and "minor" shall be configurable values per line on an AGCF 104 and are defined based on a number of audit failures over a particular time period.

A line may be continuously audited until the line is unprovisioned or the line is marked as being denied for service. However, once a line comes back online, the AGCF 104 may immediately register the line in the IMS. After a call is terminated on an MTA, the AGCF 104 may perform an audit check after a pre-set configurable time, such as 20 seconds, to proactively monitor a line status if a user does not respond to a call. This timer may be configured on the AGCF 104, but is to be less than a "Termination INVITE timeout" timer that is configured on the IMS core. In addition, the AGCF 104 may perform an audit check on the line after a termination call to the line fails.

AGCF SIP Signaling Interface Requirements

According to example embodiments, the AGCF 104 may include an Mw SIP interface and have the Mw interface toward the I/S-CSCF representing P-CSCF toward the IMS core. In addition, the AGCF 104 may support SDP and telephone numbers in E164 number format in signaling messages toward the IMS core. The AGCF 104 may represent common SIP header field names in an abbreviated form. This may be useful if messages would be too large to be carried (e.g., exceeding a maximum transmission unit (MTU) when using UDP). Furthermore, the AGCF 104 may provide a "P-Access-Network-Info" private header extension in SIP messages with an access network type as "DOCSIS." Thus, the IMS core may provide location-based services based on an endpoint access network.

In addition, the AGCF 104 may provide a "User-Agent" header in SIP messages. The header may include MTA subscriber gateway and MTA specific information which is associated with a particular subscriber line.

The AGCF 104 may provide a P-Preferred-Identity header in SIP request messages to the IMS core if a subscriber gateway line is associated to more than one PUID at registration time. Thus, all PUIDs which are assigned to a subscriber line may be communicated to the AGCF in 200 OK messages after successful line registration in the IMS core. A P-Associated-URI header in a 200-OK message may include all PUIDs which are associated with a subscriber line.

A SIP UPDATE message method may be supported by the AGCF 104 to provide greater control over SIP session parameters including SDP (e.g. to update media parameters of an existing session) and session timers (to verify session availability). Furthermore, AGCF 104 may provide a SIP PRACK method in order to provide reliable and ordered delivery of provisional responses.

The AGCF 104 may provide support for GRUU implementation requirements per subscriber line and the AGCF 104 may provide a globally routable user agent URI (GRUU) which is received from the IMS core in a contact address when establishing a dialog. GRUU support per subscriber line may be a configurable parameter that may be enabled and disabled for use. The AGCF 104 may provide registration event package extension for SIP GRUU implementation and may provide subscriber line capabilities per access line to the IMS core as part of a register request. The capabilities feature tags per use may be configurable and be enabled and disabled.

The AGCF 104 may re-register a subscriber line upon receipt of a 407—e.g. a proxy authentication required response with a proxy-authenticate header. This indicates that the IMS has lost the user equipment's registration state. This is a fault condition that may cause the user registration state to become out of sync with the IMS.

AGCF MGCP Signaling Interface Requirements

The AGCF 104 may support MGCP 1.0 and all MGCP signaling events to ensure interoperability between various types of user equipment and the AGCF 104. As an example, the AGCF 104 may support a naming convention followed by the subscriber gateway, e.g. v000e5cf0e884.nye8.voip.eng.cv.net. The AGCF 104 may use SDP to provide user agents with a description of connection parameters such as IP addresses, UDP port and RTP profiles. The AGCF 104 may support embedded notifications to minimize a number of MGCP flows to initiate a call. As an example, a Request for Notification (RQNT) command may be provided in order to initiate an endpoint prior to each call:

RQNT 9 AALN/3@v000e5cf0e884.nye8.voip.eng.cv.net
MGCP 1.0
X: 1
R: ([2-9]11|[2-9]xxxxxxxxx|1[2-9]xxxxxxxxx|0T|00|[01]
911|101xxxx.T|011[2-9]x.T|0[2-9]xxxxxxxxx|*xx|[2-9]
[#T]|[2-9]x[#T]|[2-9]xxxxxx[#T]|[2-9]xxxxxxT)
S:
Q: STEP
T: L/HU,L/HD,L/HF,D/[0-9A-D#*T]
This example RQNT command includes an embedded notification request to instruct a user agent about digit maps. Other similar notifications may be supported to play a dial tone, collect digits according to the dial plan and detect on-hook whenever the phone goes off-hook.

Call agents may implement all MGCP commands, package names, events and signals which are case insensitive. However, embedded SDP descriptions may be case sensitive. The AGCF 104 may support digit maps of at least 2048 bytes per subscriber gateway access line. An actual digit map that is specified by the AGCF 104 may depend upon requirements of particular deployment.

When connections are established to a subscriber access line, the AGCF 104 may provide configurable packetization periods such as 10, 20 and 30 ms for service provider preferred media codecs which are assigned for an associated subscriber gateway, except where a packet size is explicitly defined by the G.723 codec (e.g. 30 ms). A packetization period may be varied for each codec.

The AGCF 104 may specify codecs which are requested in a call in MGCP local connection operations and SDP parameters. The SDP parameter for codecs may be specified using payload-type encodings. If a service provider preferred codec such as G.729B includes support for silence suppression, then the AGCF 104 may provide silence suppression using local connection options (S: OFF or S:ON). However, if the codec does not provide silence suppression, generic silence suppression using comfort noise may be used.

The AGCF 104 may provide echo cancellation indication in line connection parameters to the subscriber gateway to perform near end echo cancellation at the subscriber gateway. Service provider preferred DTMF digits or tone payload format may be provided. However, if out of band DTMF digits or tones are desired, the AGCF 104 may process notification of DTMF digits using MGCP notify from a subscriber line and communicate to the IMS core using a SIP Info message.

The AGCF 104 may provide multi-vendor MTA profile types which are service provider preferred in order to interoperate and comply with MGCP signaling implementations of all multi-vendor MTA models. If SIP re-registration with a subscriber line fails to the IMS core and provides a 4xx error, the AGCF 104 may terminate active calls of a particular subscriber by sending a BYE message to the IMS core. The AGCF 104 may reject SIP traffic from non-trusted elements on the Gm/Mw interface other than from IMS core elements which are trusted. Furthermore, the AGCF 104 may cause the subscriber line to be placed into a deny state if an ICMP destination unreachable or host unreachable error is received during line auditing or during AGCF 104 signaling communication with the subscriber line.

BASIC Residential Voice Features

According to example embodiments, AGCF 104 makes features transparent to end-users by integrating within a feature server or telephony application server (TAS) in the IMS network. AGCF 104 may comply with PacketCable 1.0 standards as well as PacketCable 2.0 standards and is able to interact with IMS to provide the following features.

The AGCF 104 may support anonymous call blocking by interoperating with the IMS network. For instance, an anonymous call blocker blocks incoming calls from callers who block caller ID information. The AGCF 104 may support caller ID interoperability with the IMS network. Caller ID provides a name and telephone number of an incoming caller provided this information is not blocked. Caller ID requires a caller ID compatible telephone or display device. The AGCF 104 may support private outbound calling interoperability with the IMS network. Private outbound calling may be used to hide a name and number on calls made. The person you are calling may only see "Private" or a similar message on their caller ID screen. This is known as calling line ID restriction. AGCF 104 may support caller ID blocking (*67) interoperability with the IMS network. According to embodiments, the AGCF 104 may block unwanted calls from callers on a list defined by the user. This is known as blacklisting. As an example, a subscriber may have the ability to maintain a list of fifteen numbers from which the subscriber does not want to accept incoming calls. The AGCF 104 may support call forwarding all calls unconditional to do not disturb (DND) with the IMS network. As an example, this may allow a subscriber to forward calls to a selection of predefined announcements that indicate that a subscriber is not taking calls. The AGCF 104 may support call forwarding all calls unconditional forward to do not disturb (DND) based on a time of day with the IMS network. As an example, this may allow a subscriber to forward calls to a selection of predefined announcements that indicate that a subscriber is not taking calls or to forward calls to another number during specified time intervals. The AGCF 104 may support a malicious call trace feature interoperability with the IMS network. According to example embodiments, the malicious call trace (MCT) may identify a calling party after an appropriate request.

The call forwarding unconditional all calls to a phone number may automatically redirect incoming calls to a forwarding number. The incoming call may ring on whatever phone number is desired such as a cellular telephone number or a work telephone number instead of a subscriber telephone number. In addition, multiple call forwarding may also be applied. The AGCF 104 may support call forwarding all calls unconditional to a voicemail, which allows a subscriber to forward all calls immediately to a voicemail box. The AGCF 104 may support call forwarding busy to a phone number with the IMS network. As an example, this may allow automatic redirection of incoming calls to a forwarding number so that an incoming call gets forwarded to a specified number if the subscriber number is busy. In addition, the AGCF 104 may support call forwarding busy to voicemail with the IMS network. As an example, this may allow automatic redirection of incoming calls to voicemail. The AGCF 104 may support call forwarding no answer to a phone number with the IMS network. As an example, this may allow redirecting incoming calls to a forwarding number so that a telephone call is not missed. The AGCF 104 may support call forwarding no answer to voicemail with the IMS network. As an example, this may allow redirecting incoming calls to voicemail and a user may select a number of rings after which a call may be forwarded to voicemail. The AGCF 104 may support courtesy call for call forwarding with the IMS network. As an example, if a subscriber activates a "CF with Courtesy Call" then a call may be established with a forwarded number and upon answer the CFV may be activated. If the "forwarded to party" does not answer the telephone call or is busy, then a subscriber may activate call forwarding by repeating the same procedure within a specified time, e.g. two minutes. The AGCF 104 may support splash ring for call forwarding with the IMS network. As an example, a splash ring includes notifying a subscriber who has activated call forwarding by a short ring (splash ring) whenever a call gets forwarded. The AGCF 104 may support "Find Me," e.g. "Simultaneous Ring" with the IMS network. As an example, "Find Me" supports simultaneously ringing up to three additional telephone numbers such as cellular numbers or work numbers. An incoming call may be answered by any of the telephone lines and the telephone call may be connected to whatever telephone line answers first. This feature may also be known as "Find Me Follow Me" (FFM). The AGCF 104 may support backup telephone cable modem not reachable with the IMS network. As an example, an application server may forward a telephone call to a specified telephone number when a connection to a cable modem is lost.

According to an example embodiment, FFM is demonstrated in the example below. The AGCF 104 may maintain an association of an NCS registration with a SIP registration toward the IMS core. A subscriber line may have a valid SIP registration in the IMS core, and an incoming call to a subscriber may not be terminated on the NCS/MGCP interface.

If there are connectivity issues, e.g., if the eMTA 102 loses a connection with AGCF 104 or the eMTA 102 loses a network connection abruptly, the AGCF 104 will utilize a periodic audit process in order to ping the eMTA 102 and check the connection. According to an example embodiment, a subscriber will be deemed to have connectivity failure if disconnected for thirty seconds. However, determination of connectivity failure is not limited to thirty seconds, and determination of connectivity failure may occur in less than thirty seconds and more than thirty seconds.

In the meantime, if believed to have a connectivity failure, a respective subscriber may receive an incoming call to the IMS core. The IMS core may forward the call to the AGCF 104 based on a current active SIP registration.

The AGCF 104 may try to establish the connection with the user a plurality of retries. However, upon a retry timeout, the AGCF 104 may terminate the incoming call and provide a 5xx error response, which indicates that the subscriber is not reachable. Upon receipt of the 5xx error message, the application server may invoke a backup phone feature, and forward the call to a specified third party telephone number.

The AGCF 104 may support enhanced voicemail (voicemail deposit On/Off) with the IMS network. According to example embodiments, enhanced voicemail may allow a subscriber or user to turn a voice mail deposit feature on or off. If enhanced voicemail is turned on, a calling party may deposit a voicemail. If a user has setup voicemail for an account, a party calling the user may deposit the voicemail based upon conditions such as "Call Forward Busy," "Call Forward No Answer," etc. The AGCF 104 may support retrieval of voicemail using the following example options: (a) dialing a voicemail pilot number, (b) dialing *86 and (c) dialing a subscriber number.

The AGCF 104 may support call waiting with a caller ID with the IMS network. As an example, caller ID information may be provided to subscribers to provide information regarding incoming calls when a user is on the telephone and allow a user to switch back and forth between telephone calls. When a subscriber is currently using the telephone, a tone may alert the subscriber of an incoming call. In order to pick up an incoming call waiting telephone call or to return a first telephone call, the subscriber is to press a hook switch or a flash key of the telephone. The AGCF 104 may support distinctive ringing with call waiting with the IMS network. As an example, a subscriber may place telephone numbers in a screening list. Telephone calls that are received from this screening list while a subscriber is on a telephone call ring with a distinctive ring. The AGCF 104 may support cancelling call waiting with the IMS network. As an example, a subscriber may cancel call waiting by dialing a vertical service code, e.g. *70, from a telephone before making a telephone call. The AGCF 104 may support a busy redial with the IMS network. As an example, a subscriber may call a telephone number and receive a busy signal. The subscriber may dial *66 to use busy redial. The AGCF 104 may telephone the subscriber back when the called party telephone line becomes free. In addition, if the subscriber makes an outgoing telephone call to a party that is busy on a telephone call and the subscriber wants to receive a notification when the telephone line becomes available, this feature may be activated and the subscriber may receive a notification/ring when the dialed party becomes available. Once this feature is activated, busy redial may continue up to thirty minutes and if the line becomes free, a subscriber's telephone will sound a special ring. When the subscriber answers the telephone, then the AGCF 104 rings the other party. For example, upon receiving a busy signal, a subscriber may hang up the telephone, dial *66 and hang up the telephone. Busy redial may then continue to dial the telephone line for up to thirty minutes. Once the telephone line becomes free, the subscriber's telephone will sound a special ring. Once this special ring is received and the subscriber answers the telephone, the subscriber will be automatically connected. Busy redial may also be deactivated by dialing *89 once it is activated.

AGCF 104 may support three-way calling. According to example embodiments, a telephone call may include three parties. First, a subscriber may dial a first recipient. The subscriber may then press the hook switch or the flash key in order to place the first caller on hold. Once the subscriber hears a dial tone they may dial a second telephone number. Once the second recipient answers, the subscriber may speak privately to the second recipient while the first call is on hold. The subscriber may create the three-way telephone call by pressing the hook switch or flash key again.

AGCF 104 may support VIP ringing, e.g. distinctive ringing. According to example embodiments, a subscriber may designate up to thirty-two telephone numbers to ring with a distinct ring tone when a call is received.

AGCF 104 may support call returning by dialing *69. As an example, call return may allow a subscriber to identify and dial a last incoming caller from a telephone line. When the subscriber dials *69, the subscriber may hear an announcement about the last incoming caller's number and is prompted with an option to place the call back to the previous callers. When the user accepts the option for the call return, the call may be placed to the last caller. A subscriber may pick up a handset and upon hearing the dial tone may dial *69. The last caller's number may be announced as long as caller ID information is available. The subscriber may then be prompted to press "1" to call the last caller back. However, the subscriber may only initiate a call back within the area code.

The AGCF 104 may support hotline. According to example embodiments, the hotline may allow a subscriber to place a call to a pre-assigned number without dialing by simply going "off-hook." The pre-assigned number may be administrable on a line basis. Thus, AGCF 104 may support the generation of an INVITE request to a predefined request uniform resource identifier (RURI) such as 5163992968@ims.cv.net as soon as a subscriber telephone goes "off-hook." This feature may allow a subscriber to have a hotline to a specific number such as emergency personnel, security or a customer support center.

AGCF 104 may support warmline. According to example embodiments, warmline may allow a subscriber to place a telephone call to an assigned telephone number without dialing by simply remaining "off-hook" for a given interval of time. The subscriber may also choose to originate calls normally. In order to override the pre-assigned number, the subscriber may begin dialing within an administrable time period. If dialing does not begin before the time period expires, the call may be routed to a pre-assigned telephone number. This pre-assigned telephone number may be administrable on a line basis. The AGCF 104 may support generation of an INVITE request to a predefined RURI after a telephone remains off-hook without user-dialed digits for a locally defined time interval. This time interval is configurable per subscriber line. For instance, if a user dials a telephone number before the defined time interval expires, the telephone call may complete normally. This may allow a subscriber to have a direct line to a specific number such as a customer support center, etc.

AGCF 104 may support necessary signaling to allow fax over IP. As an example, a subscriber may send a fax or may leave a fax message for another subscriber.

AGCF 104 may support calling name delivery support. As an example, a subscriber may get a calling name for an incoming call if an originator does not have a locally configured CNAME. A database lookup may occur with the calling number in order to determine the calling name. AGCF 104 may support calling name delivery blocking. As an example, a subscriber may block their calling name while making a call to a destination subscriber.

AGCF 104 may support calling identity delivery or suppression (CIDS). As an example, subscribers may deliver or suppress their caller ID (name & number/number) to the called party subscriber.

AGCF 104 may support routing international telephone calls. As an example, outbound international calling may be supported under various subscriber plans. In addition, international calling may be supported for free to particular countries, e.g. Canada.

AGCF 104 may support 411 as well as other "N11" services such as 311, 511, 611, etc. As an example, a subscriber may make calls to directory assistance or enhanced directory assistance to receive information such as local and nationwide telephone listings, lottery results, local movie times, etc.

AGCF 104 may support enhanced 911 services. As an example, enhanced 911 services, e.g. E911, may provide emergency services with the name, telephone number and home address that are associated with a subscriber account. If a caller is unable to speak, emergency services may be dispatched. According to example embodiments, E911 telephone calls may be connected to the same 911 call centers as conventional systems and will be answered by emergency dispatchers 24 hours a day, 365 days a year.

AGCF 104 may support flexible error response codes. As an example, during an active call session, if a subscriber gateway is unavailable, the AGCF 104 terminates an active call by sending a BYE/487 requested terminated error to the IMS core. In addition, if subscriber line failure is detected, if any incoming calls are sent to the subscriber, the AGCF 104 sends 4xx or 5xx error responses for incoming calls to the IMS core. The SIP error response may be configured based on a provider preference.

Feature Interactions

AGCF 104 may support caller name and display feature interoperability with the IMS network. The AGCF 104 may display the name and telephone number of an incoming caller to an endpoint based on a PAI header and privacy header values that are in an incoming SIP invite. If there is no PAI header in an incoming invite, the AGCF 104 may signal the line to display "Unavailable" for both name and number.

AGCF 104 may support handling managing the dial-tone and ring-tone as well as mid-call events that are used for many services. As an example, the AGCF 104 may signal the embedded multimedia terminal device which tone to play based on a call state. For example, the AGCF 104 may signal a call waiting tone, a stutter dial tone, a dial tone and a busy tone.

AGCF 104 may support a registration event subscription support to interoperate with the IMS network. The AGCF 104 may support subscription/re-subscription/de-subscription for a registration even to the IMS core on behalf of each registered NCS user. If the registration status of the telephone line changes, the AGCF 104 may receive notification updated for a respective line. Based on "state" and "event" parameter values in the notify body, the AGCF 104 may act accordingly.

The AGCF 104 may support feature state synchronization support for feature interoperability with the IMS network. For example, certain residential SIP telephone (RST) features and supplementary features such as ring splash and three-way calling may be accomplished by synchronizing feature data between the AGCF 104 and an application server. The AGCF 104 may support a "UA-Profile" event package subscription/re-subscription with the IMS application server for dynamic feature data synchronization. During feature processing, upon receipt of a NOTIFY request that reports the "UA-Profile" event and includes an XML document with a Dial Tone Management element, the AGCF 104 may set a current dial tone to a value indicated by a dial-tone-pattern element that is received in a message body.

According to example embodiments, AGCF 104 supports ring splash using a "UA-Profile" subscription to send a notification from the AGCF 104 to an IMS application server. The AGCF 104 may maintain a local copy of a forward count based on a notification received as a result of an initial post boot subscription to the IMS application server. When the call is forwarded, the IMS application server will send the notification with the new count. The AGCF 104 may examine the new call forward count in the notification and play the ring splash MGCP signaling event to the endpoint line for 2-3 seconds followed by a regular dial tone. However, if the AGCF 104 does not support explicit subscription for the "UA-Profile" to the IMS core, the application server will indicate an "Alert-Info" header with a "Ring Splash" tone in the call forward diversion indication Invite message to the originally targeted user. Upon reception of the Alert-Info header, the AGCF 104 plays the Ring Splash MGCP signaling event to the subscriber line.

AGCF 104 supports a Message Waiting Indication (MWI) to an endpoint line according to the following embodiments. The AGCF 104 may explicitly subscribe/re-subscribe/de-subscribe for a "Message Summary" to the IMS core on behalf of each registered NCS user. Once subscribed, the AGCF 104 may receive solicited notifications reporting the "Message Summary" with a "Messages Waiting" field set to "Yes." The AGCF 104 may then set a current dial tone to a message waiting tone when the subscriber goes "Off-Hook." The AGCF 104 may maintain the MWI pending voice mail status for each user and signal the "Visual Voice Mail Indicator On" for the device that is connected to the user line. This may occur whether or not the line is in an active call state or is in an idle state. When the subscriber goes "Off Hook," the AGCF 104 may play the message waiting tone for three to four seconds that indicates that there are pending voice mail messages for the user, followed by the regular dial tone. When the "Message Summary" with the "Messages Waiting" field is set to "No," the AGCF 104 clears the message waiting status and signals the "Visual Voice Mail Indicator Off" to turn off a visual voice mail LED.

If the AGCF 104 does not support subscription to "Message Summary" to the IMS core, then the AGCF 104 should accept unsolicited MWI notifications for pending voice mail messages for NCS users.

Upon receipt of flash-hook from the MTA/eMTA device 102, the AGCF 104 may support a flash-hook event notification to the IMS core using a number of methodologies. The AGCF 104 may support loose coupling or may support tight coupling with the TAS server.

Loose Coupling: As an example, the AGCF 104 may support mid-call features such as call-holding, three-way calling, etc. based on prior knowledge of user feature synchronization between the AGCF 104 and the IMS application server using a user profile delivery feature. The AGCF 104 may detect features and send an event notification to the application server based on the SIP Invite dialog.

Tight Coupling: As an example, the AGCF 104 may not implement service logic for mid-call features after flash-hook detection. The application server may have complete control of features of the user and may determine which services to provide based on subscriber subscription information and may instruct the AGCF 104 on further action. The AGCF 104 does not need to have subscriber feature knowledge. The flash-hook event notification of an analog access line to the AGCF 104 may be provided to the application server using a SIP Info message dialog. The SIP Info messages for flash-hook reporting may use a normal syntax and may be manipulated by the AGCF 104 to provide interoperability with the IMS components.

The AGCF 104 may support call hold using both Loose Coupling and Tight Coupling. For Loose Coupling, during an active call state, the AGCF 104 may detect the receipt of a flash hook event from a subscriber line and signal playing of a dial tone. In addition, the AGCF 104 may send a re-invite message to the application server to have the other caller placed on hold. The AGCF 104 may continue to monitor for a flash-hook in order to resume the call that was placed on hold. For Tight Coupling, the AGCF 104 may detect receipt of a flash-hook event from a subscriber line and send a SIP Info message to the application server that indicates to the application server to place the other party on hold. The application server may cause a dial tone to be played, collect digits and apply services. As an example, the SIP Info message may include "Content-Type: application/ hook-flash" and "Signal=hf."

According to example embodiments, the AGCF 104 may support distinctive ringing with the IMS network. The AGCF 104 may interpret a distinctive ring indication from the "Alert-Info" header of the SIP Invite message from the application server if the called party includes a distinctive ring tone subscriber configuration from a particular calling party. The AGCF 104 may be configured in order to expect particular contents within a header which represent different distinctive ring tones. As an example, an "r1" signal may represent a long ring, an "r2" signal may represent a short-long-short ring, an "r3" signal may represent a short-short-long ring and an "r4" signal may represent a long-long ring.

The AGCF 104 may support call waiting and distinctive call waiting with the IMS network using both Loose Coupling and Tight Coupling. Loose Coupling: If a call waiting feature is activated for a terminating caller, the AGCF 104 may detect a second call leg invite from the application server for a subscriber telephone line and signal that the telephone line should play a call waiting tone and provide a calling party name and number if available. In addition, if distinctive call waiting is enabled then the application server may insert a distinctive call waiting alert to a called party in an Alert-Info header of an Invite Message sent to an AGCF 104. The AGCF 104 may interpret Alert-Info distinctive call waiting ringing tones and provide different ringing signals. As an example, an "r1" signal may be a single tone, an "r2" signal may be "short-short," an "r3" signal may be "short-short-short" and an "r4" signal may be "short-long-short." The application server may send distinctive ringing tones in an "Alert-Info" header and the AGCF may interpret a received ringing tone.

Tight Coupling: If a call waiting feature is active for a terminating call, the application server may receive an incoming call and send a SIP Info message to the AGCF 104 that provides "Event: start-CWT." The AGCF 104 may interpret the SIP Info message and program or signal the subscriber line to start a call waiting tone. The application server may stop the calling waiting tone by having the application server send a SIP Info message to the AGCF 104 that provides "Event: stop-CWT." The AGCF 104 may then signal to the subscriber line to stop the call waiting tone. The SIP Info messages may include a syntax which is known the application server, and the AGCF 104 may manipulate fields in the SIP Info header to provide proper interoperability with IMS components.

Call Waiting Start INFO
INFO sip:example.com SIP/2.0
Event: start-CWT
P-Asserted-Identity: "CVC"
<sip:+15163992986@ims.cv.net>
Alert-Info: file:///PacketCableRST/wt2
To stop call waiting (sent from telephony application server (TAS) to AGCF):
INFO sip:example.com SIP/2.0
Event: stop-CWT According to example embodiments, the AGCF 104 may support a three-way call using both loose coupling and tight coupling. The AGCF 104 may support media mixing in an AGCF media gateway. The AGCF 104 may detect receipt of a first flash hook event from a subscriber line. Next, the AGCF 104 may play a dial tone to the subscriber line and send a re-invite request to the application server to place a current call on hold. Upon receipt of dialed digits from a subscriber, the AGCF 104 may open a new dialogue with a third party by sending an INVITE request with the dialed digits used as a Request-URI to the application server. AGCF 104 shall monitor for the second flash-hook event, after receiving the second flash-hook event and if AGCF 104 doesn't support 'Conference-URI Factory' then AGCF 104 shall send re-invites to User B and C with new SDP offer contains the MGC IP media termination details to perform the 3 way audio mixing or transcoding in the media gateway.

AGCF 104 may support media mixing of the three way call feature invoked by the subscriber served by the AGCF 104 in the network based MRF (Media Resource Function), using the Conference Factory URI list as defined in 3GPP TS 24.147. During a stable two-party call from A to B, the AGCF 104 may detect the receipt of a first flash hook event from a subscriber line A. The AGCF 104 may then play a dial tone to the subscriber line and simultaneously send a re-invite request to place a current call on hold. Upon receipt of dialed digits from the user A, the AGCF 104 may open a new dialogue by sending an INVITE request with the dialed digits used as a Request-URI to the application server to establish an active call with C. The AGCF 104 may monitor for a second flash hook event. After receiving the second flash hook event from user A, then AGCF 104 may create a conference URI towards application server, which controls the network based conference creation and establishment as defined in the 3GPP TS 24.147 specification to perform the three-way audio mixing or transcoding in the MRFP. The AGCF 104 may support tight coupling as well. During an active call, the AGCF 104 may detect receipt of a flash hook event from a subscriber line and send a SIP INFO message to the application server that indicates a flash-hook event in order to trigger the application server to keep another party on hold. The application server may insert a media server into a media path to play a dial tone and collect dialed digits to establish a call between A and C. The AGCF 104 may monitor a second flash hook event from A and send a SIP INFO message to the application server. The application server may interpret the second flash hook event as a trigger for three-way audio mixing and send re-invites to A, B and C with a SDP offer which contains MRF IP media termination details to perform three-way audio mixing or transcoding in the MRFP.

The AGCF 104 may support delayed vertical service codes (VSC), and AGCF 104 may be aware of all delayed vertical service codes to be used. The AGCF 104 may detect a dialed code from an embedded media terminal adapter as a delayed VSC (e.g. *67, *82, etc.) and signal a subscriber line to play a stutter tone for 3-4 seconds and play a regular dial tone while afterward while waiting for a user to dial digits. Once digits are collected from the user, the AGCF 104 may send a complete dial string (e.g. *675168039403) in an INVITE request URI to the IMS core. Telephony application server (TAS) based on the SAC (service access code) identified in the INVITE from the AGCF 104 may invoke a respective feature associated with the SAC.

The AGCF 104 may support "suspend no profile," thereby only allowing a user to dial 611 and 911 and allowing inbound calls to the user. This "suspend no profile" feature may be managed through the IMS network, specifically in HSS and TAS servers for regulatory services.

The AGCF 104 may support "police ring down" which supports hotline type services, e.g. all outbound calls are routed to specific police phone numbers. This "police ring down" feature may be managed through a TAS server. The AGCF 104 may normally pass calls over using unchanged digit maps.

The AGCF 104 may support media terminal line on hook processing and Bye delay timer requirements. The AGCF 104 may serve a calling user endpoint with an active session (where the called party has answered the call and two-way media is being exchanged). The AGCF 104 may detect an on-hook condition for the media terminal adapter before receiving a BYE from the remote party. In that case, the AGCF 104 may send a BYE request to the remote party. The AGCF 104 may start a BYE delay timer which delays the sending a BYE to allow the user to pick up the phone again and sends comfort noise RTP packets to the remote user endpoint using RTP payload format provided in RFC 3389. While the BYE delay timer runs, the previously established session may still be kept active. If the AGCF 104 detects an off hook event from the media terminal adapter before expiration of a BYE delay timer, the AGCF 104 may stop the BYE delay timer and stop sending comfort noise packets to the remote user endpoint and resume a media session according to previously negotiated SDP modes. If the BYE delay time expires, the AGCF 104 may send a BYE request. If a BYE request is received while the BYE delay timer is running, the AGCF may stop the BYE delay timer and respond to the BYE with a 200 OK. While the BYE delay timer is running, the AGCF 104 may reject any incoming call with a 486 response.

Supplementary Residential Features

The AGCF 104 may support a number of additional supplementary features. The AGCF 104 may make these features transparent to end users by integrating them with the feature server, e.g. telephony application server (TAS) in the IMS network.

The AGCF 104 may support two digit speed dialing. According to embodiments, two digit speed dialing may allow a user to dial unique two digit speed dial codes which may be converted into a full digit string. The full digit strings or telephone numbers may be mapped in and processed as if the user dials the entire string. According to example embodiments, there may be thirty-two two-digit strings.

The AGCF 104 may support one digit speed dialing. According to embodiments, unique one-digit speed dial codes may each be converted into a corresponding full digit string. The full digit strings are mapped in and processed as if the user dials the entire string. According to example embodiments, there may be eight one-digit strings.

AGCF 104 may support a maximum call duration timer. This maximum call duration timer feature may provide a maximum time that a subscriber is able to hold onto an active call. The network may disconnect the call once this timer is reached. This maximum duration may be set by an administrator.

The AGCF 104 may provide signaling to support codecs that are supported by the network. The codec may be selected based on choices which are provisioned in a subscriber QOS profile.

The AGCF 104 may support selective call forwarding (SCF) which provides a subscriber with a list of numbers that the subscriber would like to forward to a direct number. If a match is found in the selective calling forwarding list for a calling party, the call may be forwarded to a number.

The AGCF 104 may support remote activation call forwarding (RACF) allowing a subscriber to activate/deactivate and change a redirect number from another telephone line by dialing an RACF access code. RACF subscribers may access their call forwarding feature by dialing the RACF direct number. The subscriber may receive an announcement requesting a primary direct number followed by an announcement requesting entry of a personal identification number (PIN). Upon verification of the direct number and the PIN, an announcement may be played requesting a service access code for a type of call forwarding procedure.

AGCF 104 may support call holding. According to embodiments, call hold is a hook flash feature. A subscriber may place an active party on hold by pressing "hook flash." In addition, the AGCF 104 may support music on hold. According to embodiments, music on hold may allow a party which is on hold to listen to music. When a subscriber activates the music on hold feature and places a caller on hold, the caller on hold may hear music.

AGCF 104 may support calling waiting activation/deactivation. According to embodiments, call waiting activation/deactivation may provide a subscriber the opportunity to activate or deactivate call waiting with a VSC (vertical service code). AGCF 104 may support call waiting caller notification. According to embodiments, a subscriber may notify a caller that the call is received if the subscriber is busy. AGCF 104 may support preference category during a catastrophe, e.g. a hurricane that knocks out telephone service. According to embodiments, this feature may impose a restriction on services during a catastrophe. The restriction may be on origination events, but may not include 911 or 411 calls.

AGCF 104 may support silence suppression disabling for facsimile. This feature is related to transmitting faxes through gateways when a fax is detected and G.711 is used for a fax/modem transmission. In addition, AGCF 104 may support fax and modem tone detection for PacketCable. The network may support fax and modem calls by requesting that gateways detect a modem or fax tone. Furthermore, the AGCF 104 may support T.38 fax interaction support.

AGCF 104 may support serial ringing. According to embodiments, a subscriber may receive a call at different direct numbers when an initially dialed direct number is busy or is not answered. AGCF 104 may support subscriber controlled input for voicemail. According to embodiments, a subscriber may activate or deactivate call forwarding to voice mail from a telephone by dialing a unique code or vertical service code that is different from codes which are used for call forwarding to telephone numbers.

AGCF 104 may support disabling or enabling voicemail audible notifications. According to embodiments, subscribers may choose a visual message waiting notification or a stutter dial tone indication for voicemail or disable both. In addition, AGCF 104 may support message waiting indication support (visual and audible tone). According to embodiments, voicemail subscribers may be notified using a visual notification or an audible notification whenever a new voicemail message is received in an inbox. The notifications continue to notify a subscriber as long as there is a voicemail in the inbox.

According to example embodiments, AGCF 104 may support business features which interoperate with the IMS core network. The AGCF 104 may integrate with the feature server (TAS) in the IMS network in order to make these business features transparent to subscribers.

AGCF Business Features

AGCF 104 may support enhanced voicemail features for business subscribers. In addition, the AGCF 104 may support a call return feature, call waiting with a caller ID, busy redial/ring back when free, three-way calling, VIP ringing, call forwarding when busy, call forwarding no answer, find me or simultaneous ringing, anonymous call blocking/rejection, caller ID display, hotline features, 411 and 911, international calling and call hold and retrieve.

AGCF 104 may further support additional business-related features. According to embodiments, AGCF 104 may support blind call transfers which allow a subscriber to transfer a call to a party while keeping another party on hold. A subscriber utilizing this feature may transfer a call to another subscriber in a ringing state. This feature is somewhat similar to a call conference, but the user endpoint may hang up the telephone rather than using a hook flash as in a call conference. For the blind call transfer, the user endpoint may hang up before receiving a "200 OK" from a third party.

AGCF 104 may further support attended call transfer. According to embodiments, a subscriber may transfer a call to another subscriber while keeping the first subscriber on hold. A subscriber may transfer a call to another subscriber in a ringing state. This is somewhat similar to a call conference, but the user endpoint may hang up the telephone rather than using a hook flash as in a call conference. For the attended call transfer, a user endpoint may hang up after establishing a session with the third party.

AGCF 104 may support inbound toll free services. According to embodiments, the inbound toll free number may provide a toll free number and a business subscriber may provide this toll free number to customers. AGCF 104 may support call parking. According to embodiments, ongoing communications may be interrupted from a same or different terminal. Call parking may allow a subscriber to place an answered call on hard hold and may be retrieved at a later time. While the call is on hold, the subscriber may hang up and place or receive other telephone calls. A call retrieve access code may then be dialed to retrieve the parked telephone call from any station within the business group. In other words, the parked call may be retrieved from a station that placed the call on hold or from another station.

AGCF 104 may support group call pickup which allows a direct number in a group to answer any ringing telephone line in a same call pick-up group. Call pick-up groups may be created by a business group administrator. A station user may pick up a ringing or alerting call from another station within the same call pickup group by dialing an access code for call pickup (CPU).

AGCF 104 may support inband/outband features as well as providing a PRI interface for business subscribers.

AGCF DNS Requirements

According to embodiments, AGCF 104 may support P-CSCF and I-CSCF fully qualified domain name resolution based on a DNS query to an external DNS server. The AGCF 104 may support selection of P-CSCF/I-CSCF based on service (SRV) resource records priority and weight. According to embodiments, SIP requires SRV support by network elements. AGCF 104 may resolve a selected SRV record to a user's records. During an initial discovery of an IMS core network element, the AGCF 104 may support receipt of multiple SRV records. However, if an error occurs and a foreign IMS network element is black-listed, the AGCF 104 may choose a next SRV record and the forward the request.

The AGCF 104 may support DNS query load balancing across multiple DNS servers. However, if no DNS server is reachable, the AGCF 104 may continue to use cached information that is obtained during a previous query regardless of an expired time to live (TTL). The AGCF 104 may be capable of resolving fully qualified domain names in a request message using DNS.

AGCF Call Processing

According to embodiments, the AGCF 104 may act as a gateway controller controlling customer premises access point nodes, e.g. cable modems, media terminal adapters, and embedded media terminal adapters using an NCS variant of the PacketCable 1.0 specification. The AGCF 104 may act as a SIP gateway with respect to IMS SIP functional entities, providing SIP 2.0 user endpoint functionality as well as P-CSCF functionality for legacy terminals which are connected using customer-premises equipment. Functions include SIP registration to the IMS core, generation of identities, creation of charging identifiers and authorizing media resources.

According to example embodiments, the AGCF 104 may support message flow including registration, subscription and notification, transactions and a call. Registration may include initial registration, re-registration and de-registration. Subscription and notification may include general subscription and notification and subscription and notification of registration status. Transactions may include request routing and privacy handling. The call may include call setup, call teardown and session refreshment.

The AGCF 104 may perform signal interworking between SIP via an Mw reference point and PacketCable 1.0 NCS via a P1 reference point thereby providing protocol translation. In addition, the AGCF 104 may pass dialed digits to an application server to perform services.

Routing between endpoints within the AGCF network may performed via the originating S-CSCF. The originating AGCF 104 may be received as a user agent and the process of finding a destination S-CSCF for another AGCF may be the same for the destination IMS user. The AGCF 104 may formulate a Request URI and "To" headers for an outgoing intra domain in either a SIP or telephone. In addition, the AGCF 104 may formulate a "Contact" header with IP interfacing to other IMS core network elements. Originating/terminal supplementary services may be associated by an originating/terminating application server (TAS) with an ISC interface that is off of the S-CSCF. The AGCF 104 may perform corresponding actions to an NCS leg for execution of services.

Legacy terminals may be managed by the AGCF 104 in both origination and termination core networks and controlled by IMS core components. The AGCF 104 may act as a gateway controller and keep track of registration/de-registration states of the media gateways.

Upon receipt of a registration request from user equipment, the AGCF 104 may provide a SIP registration for each group of users on the user equipment. The AGCF 104 may act as a gateway controller and keep track of a state of the lines that are attached to the user equipment and keep track of whether the lines are idle, active, parked, out of service, etc. In addition, the AGCF 104 may deliver appropriate dial tone patterns as well as appropriate processing of mid-call events. The AGCF 104 is also to control call progress tones and basic announcements at user equipment. Upon receipt of an off-hook event from user equipment at the beginning of a call initiation sequence, the AGCF 104 may begin a dial tone and collect dialed digits. The AGCF 104 may then initiate a SIP outgoing call procedure toward an IMS core with the collected digits as a Request-URI.

The AGCF 104 may perform basic digit analysis to determine an "end of dialing" as well as emergency calls. In addition, the AGCF 104 may identify originating calls which are to be treated with priority and prioritize appropriately. The AGCF 104 may forward vertical service codes exactly as dialed in an INVITE message toward the IMS core. For terminating calls, the AGCF 104 may process incoming SIP invite messages received from the IMS core and interact with user equipment using respective NCS signaling events to complete a call termination process. Further, for terminating calls, upon receiving an initial INVITE request, the AGCF 104 may check for matching incoming codecs against service provider preferred media profiles assigned to a subscriber gateway. The AGCF 104 may specify service provider preferred media codecs, e.g. G.711 and G.712 to the embedded media terminal adapter endpoints during establishment of a telephone call connection. If the codecs in the INVITE message do not match a predefined media profile codec of the subscriber line, the AGCF 104 may reject the INVITE message with a 4XX error message.

According to embodiments, in an 18X message that is sent in response to an incoming initial INVITE, the AGCF 104 may set a session description protocol to matched codecs in a media profile assigned to a particular subscriber gateway. If a ring tone type is provided in a SIP INVITE message, the AGCF 104 may command user equipment to use a particular tone. However, if there is not a ring tone type provided, a default ring tone may be used. A private user identity may be assigned to a group of lines or an endpoint thereby allowing for multiple home extensions or IP centrex groups. The AGCF may be able to fork incoming SIP requests to multiple destinations.

The AGCF 104 may be provisioned to identify, locate and play announcements based on Alert-info headers which are provided by other network elements in response messages or by a response code if no announcement is requested. If a subscriber line does off-hook, the AGCF 104 may play a dial tone for fifteen seconds if no digits are received. After fifteen seconds of dead air, the AGCF 104 may then play an off-hook warning tone.

After termination of a call to a subscriber line served by the AGCF 104, the AGCF 104 may provide thirty seconds of fast busy signal to a line and a receiver off-hook warning for fifteen minutes.

AGCF Network

According to example embodiments, the AGCF 104 may support IPv4 and routing, supporting TCP and UDP transport standards. Further, the AGCF 104 may support access control lists which may be configurable to permit allowed IP addresses.

The AGCF 104 may support NTP (network time protocol) to sync with a network based time machine. Thus, all cards within distributed components, local system or software functions which require time synchronization may sync correctly with the network time machine. The AGCF 104 may provide mechanisms to sync with multiple NTP servers.

AGCF Billing

According to example embodiments, AGCF 104 may support writing call detail records locally and provide store and forward. Furthermore, writing of call detail records may be enabled or disabled. The AGCF 104 may transfer call detail records using FTP or SFTP to a remote location and a time for remote storage may be configurable. The AGCF 104 may support failure conditions with the transfer of such files.

The AGCF 104 may archive billing records at a configurable time interval. In addition, the AGCF 104 may maintain local records for a configurable time period. The AGCF 104 may support call detail record file backup and management, and call detail records may be backed up to a separate directory after they are retrieved. The AGCF 104 may support IMS charging via an Rf interface for integration with an IMS call charging function (CCF).

AGCF Provisioning

According to embodiments, AGCF 104 subscriber provisioning may provide services to a customer. The AGCF 104 may combine the functions of an NC/MGCP controller as well as a SIP gateway, coordinated by an internal subscriber manager. Upon registration, the AGCF 104 may provide appropriate credentials for users, e.g. IMPI, IMPU. The IMPI is an IMS private user identity used for subscription, authentication and authorization. The IMPU is an IMS public user identity (AOR) that is used for signaling routing and QOS.

Furthermore, the AGCF 104 may be configured with corresponding subscriber information when provisioned by a centralized system (provisioning system/OSS). The AGCF 104 may also receive line profile information from a home subscriber server when line configuration data is not provisioned internally. OSS provisioning for the AGCF 104 may map an IMPI/IMPU to an endpoint ID and the IMPU and IMPI may be in any recommended format. A DN that is mapped in a line side configuration profile and associated with an endpoint ID may be used as a username part of a SIP URI of an IMPU. For example, SIP: +12764547646@cablevision.net,user=phone and/or tel URI such as tel: +12764547646.

The AGCF 104 may provide support for an entire length of a media terminal adapter gateway endpoint ID such as v000a5ce0e984.agcf.voip.domain.net. It is notable that a subscriber endpoint ID may include FQDN-MAC address mapping.

According to embodiments, the AGCF 104 may support multiple codec profile groups. Each codec group may support multiple codecs. During subscriber gateway provisioning, each media terminal adapter may be assigned a particular codec profile based on the media terminal adapter model type. Furthermore, each subscriber gateway may be assigned a particular codec profile during provisioning. The AGCF 104 may provision multiple access lines' information and respective SIP credentials detail using a single subscriber gateway (media terminal adapter).

The AGCF 104 may verify that an NCS signaling IP address of a subscriber gateway line is obtained legitimately through provisioning. A subscriber gateway may obtain a signaling IP address dynamically. The AGCF 104 may verify that the subscriber gateway FQDN ID that is provisioned in the AGCF 104 resolves to the RSIP signaling IP address of the subscriber line that is attempting to register. If the IP address does not match, the AGCF 104 may reject the RSIP registration messages from the media terminal adapter.

In addition, a subscriber gateway may obtain a static signaling address. Based on requirements, the media terminal adapter may be assigned a static signaling IP address and a same IP address may be provisioned in the AGCF 104. The AGCF may confirm that an IP address that is sending signaling messages matches the IP address that is provisioned for a particular subscriber gateway. If the IP address does not match, the AGCF 104 may reject the RSIP registration messages from the media terminal adapter.

According to embodiments, an eMTA may include multiple lines. Thus, the AGCF 104 may provide an API in order to provision multiple lines under a main household identifier. The AGCF 104 provisioning API may support configuration of SIP credentials as well as mapping of SIP to a line and may be based on industry known protocols such as SOAP or XML as well as applicable RESTful interfaces. If a subscriber license limit on AGCF 104 is reached, then the AGCF 104 may reject additional subscribers at a provision stage.

AGCF Redundancy

According to example embodiments, AGCF 104 may provide redundancy in order to provide a high level of availability to subscribers. Redundancy, may include, but is not limited to service level redundancy as well as network level redundancy. Service level redundancy may include signaling to process calls. Network level redundancy may include interfaces which provide layer 2 and layer 3 connectivity as well as failover considerations for the IMS core. AGCF 104 may provide error messages which are defined as ICMP errors, transaction timeouts (no response received) or 5xx errors without a Retry-After header. The AGCF 104 may provide fully redundant network interface blade servers, each supporting at least one pair of redundant uplinks to a network. In addition, the AGCF 104 may provide redundant site interconnect connections for data syncing and extended local redundancy. The AGCF 104 may provide black-listing which may disallow communication to specific IP addresses if conditions are met. For example, if one-hundred errors are determined to have occurred within sixty seconds, an IP address could be blacklisted. If an IMS node outage occurs, blacklisting may cause alarms to be sent to an EMS. Thus, if an IP address is blacklisted and the IP address is restored after an outage, the alarm is to specify which IP address is being blacklisted, an error that caused such blacklisting and a network element which encountered an issue.

Local Redundancy

Figures 2A, 2B:
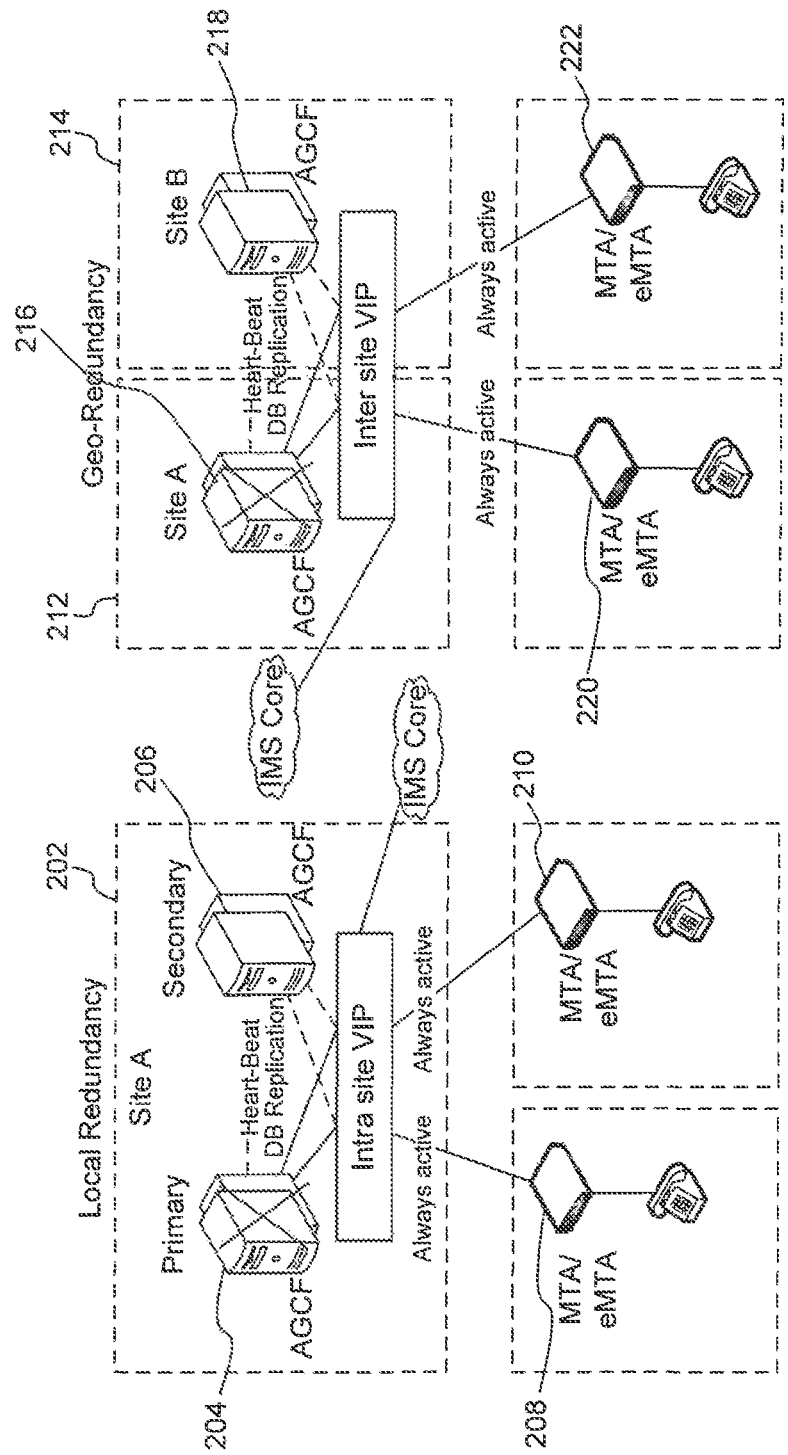
FIG. 2A illustrates an AGCF embodiment providing local redundancy.
FIG. 2B illustrates an AGCF embodiment providing geo-redundancy.

As shown in FIG. 2A, the example embodiments provide local redundancy for an AGCF. According to an AGCF setup providing locally-based redundancy, there is a site A, 202. Site A 202 includes a primary AGCF 204 as well as a secondary AGCF 206. If the primary AGCF 204 happens to fail, the secondary AGCF 206 will provide service. The AGCF 204 and 206 are shown as being in connection with and providing service to eMTA 208 and eMTA 210.

A switch over to a secondary or backup card is to occur within three seconds. Such a switch over may not cause disruptions to active calls. In addition, all call states may be copied onto redundant blade servers. Call state transfer may provide subscriber registration status, call state indicators, call paths, representation of a single IP address, and a port socket to other parties communicating with the AGCF. Further, the AGCF 204 & 206 may support session check-pointing. In other words, once a SIP 200 OK is received, a call state may be transferred to a redundant node within 100 ms.

Geographical Redundancy

As shown in FIG. 2B, AGCF may be setup in geographically diverse networks including Site A 212 and Site B 214. FIG. 2B shows that Site A 212 includes a first AGCF 216 and Site B 214 includes a second or backup AGCF 218. Each of the AGCF 216 and AGCF 218 are shown as being in connection with and providing service to eMTA 220 and eMTA 222.

AGCF may be implemented as shown in FIG. 2B and may be arranged in the following manner: (1) Multiple AGCFs are active, (2) One Active AGCF/One Passive/Backup AGCF or (3) a combination of (1) and (2). If an outage does occur, a backup AGCF will be utilized. According to embodiments, there may be a 1-1 or 1-N ratio of backup AGCFs to active AGCFs. In a geo-redundancy mode, upon detecting an AGCF failure at a site A, eMTAs may attempt registration with an AGCF at a site B. AGCFs at both site A and site B may have a database replication mechanism and may be provisioned with same users. Thus, the AGCF at site B may attempt to deregister the user at site A and register the user at site B. The AGCF may include a mechanism to handle a failover situation as well as provide load balancing. Redundancy may include both system level as well as system wide (geo-redundant) redundancy which allows an AGCF to "talk" to multiple IMS cores.

According to example embodiments, I/S CSCF1 may be recognized as failed by an AGCF during initial registration or during another signaling transaction. In other words, no response is received or ICMP may be received. The AGCF may contact the I/S CSCF using a receiving address list via DNS SRV and a query.

If I-CSCF1 is not reachable during SIP registration/re-registration, AGCF will assume that the I-CSCF1 failed and may send registration to an alternative I-CSCF based on the I-CSCF addresses list received via DNS SRV and a query.

If S-CSCF is not reachable, then based on an origination SIP Invite time out from AGCF to S-CSCF, AGCF may assume that the S-SCCF failed and may send registration to the IMS Core to establish a new S-CSCF association with the subscriber line.

Any network element may intend in participating in a geo-redundancy architecture is to operate under a configurable % of utilization. In other words, in the event of a total site outage, a backup site may care for a full load and neighbors as well as operate at, or around a configurable % of utilization. However, according to example embodiments, this utilization is only related to load sharing methods and does not apply to active/standby implementations.

The AGCF shown in FIG. 2B may support geo-redundancy while also maintaining a virtual IP address across geographically isolated nodes. Thus, after a total site outage, a redundant site's AGCF may assume ownership of a virtual IP address within three seconds. After a total site outage, a redundant site's AGCF may begin accepting new requests within thirty seconds. The procedure of moving to a backup AGCF is to be 100% autonomous. After a total site outage, the redundant site is to assume an active role without any intervention. Thus, the redundant AGCF may assume a full call and registration load from all subscribers. If the original site does come back online, the active AGCF may support a mechanism to move subscribers back to the original site.

Figure 3:
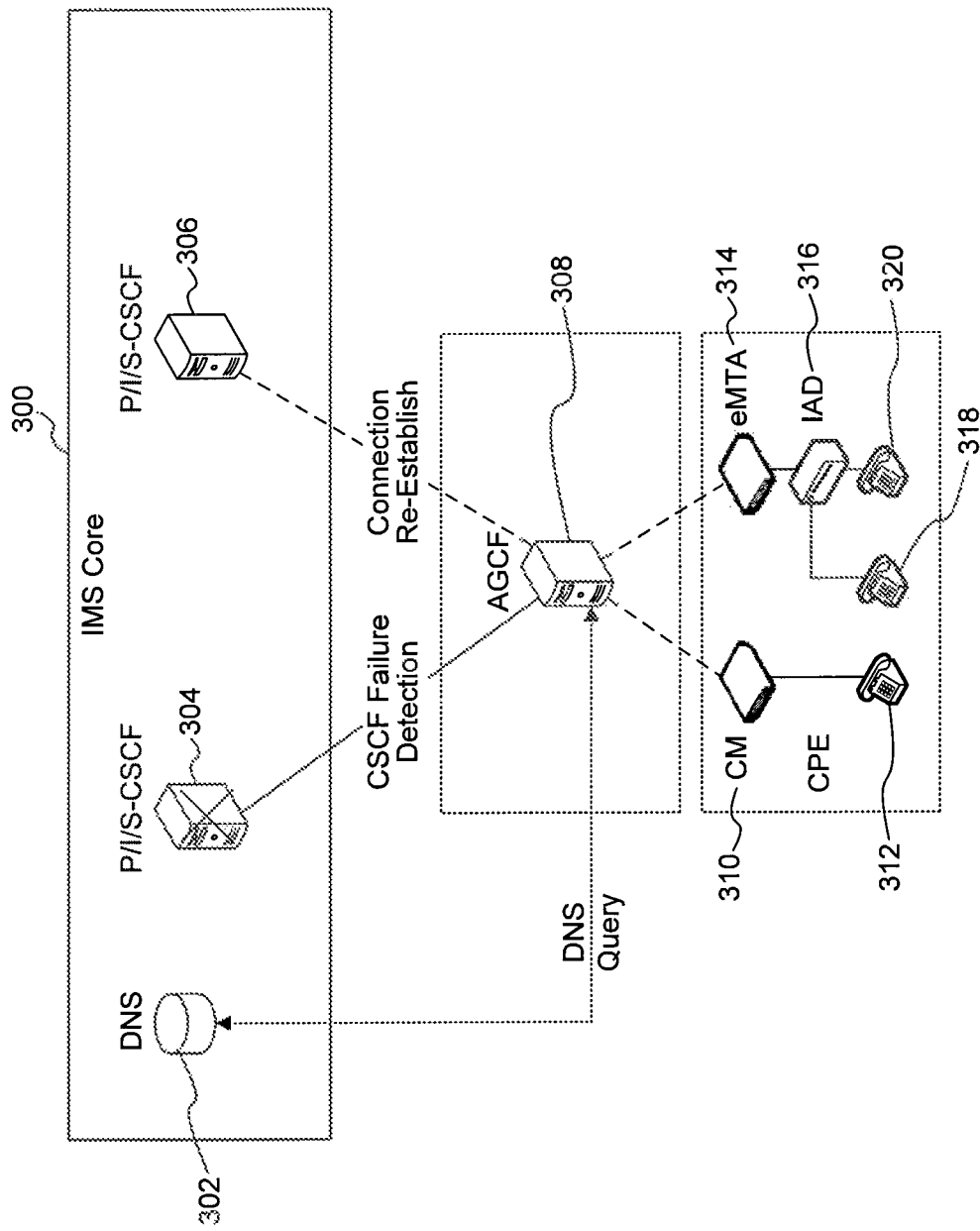
FIG. 3 illustrates network level redundancy according to example embodiments.

FIG. 3 shows AGCF network level redundancy via a block diagram of an IMS core 300 that is in communication with an AGCF and CPE. As is shown in FIG. 3, the IMS core 300 may include a DNS server 302 having a database, and a plurality of P/I/S-CSCF servers 304 and 306. FIG. 3 shows two P/I/S-CSCF servers, but embodiments are not limited to two P/I/S-CSCF servers and may include more than two servers. The AGCF 308 is in communication with the DNS server 302 as well as the plurality of P/I/S-CSCF servers 304 and 306. Thus, according to example embodiments, if one of the P/I/S-CSCF servers fails, the AGCF 308 is able to determine the failure and reestablish a connection with another properly functioning P/I/S CSCF server. As an example, the AGCF 308 is shown as being in communication with CPE including a cable modem (CM) 310 that includes one telephone device 312 as well as an embedded multimedia terminal adapter 314 that is connected to an integrated access device (IAD) 316 that has two telephone devices 318 and 320. As is known, the IAD 316 is able to integrate different types of telephone devices such as SIP telephones and POTS telephones onto a single communication medium (packet-based).

Reporting and Management

The AGCF Element Management System (EMS) may fully integrate with log management and may provide a web-based GUI that allows a local or remote operator to consult a log using optional filtering criteria, extract log content using operational filtering criteria, subscribe to log notification using optional filtering criteria as well as get information about log storage including a number of recorded events and a current and maximum log size.

According to example embodiments, the AGCF reporting may be capable of providing an administrative status of a subscriber line on the NCS interface and mapping SIP registration on a Gm/Mw interface. AGCF may indicate which side of a line is not operational (e.g., NCS side or SIP side). This will assist in helping to isolate failures (e.g., device or network unreachable). Additionally, AGCF may provide overall reporting statistics about network interfaces (e.g., Gm/Mw) to report network problems. The EMS may support operational management of a product and include the following services: (a) system configuration, (b) service statistics and observation, (c) subscriber management, (d) software management, (e) troubleshooting and monitoring and (f) permissions based access. The EMS may provide system statistics such that it may provide a centralized function in order to collect counters and present collection results to management systems, offer a unified way to manage observation counters and gauges for all observations (system and application) and deliver collection results in a unified way to management systems. The EMS may support display of performance metrics of the AGCF and generate a resource usage record that provides real-time usage and historical statistics in both a readable and graphical format on a display. The EMS may support a threshold monitoring as well as provide historical statistics that provide at least one year of history. The EMS may provide a view of platform alarms, a state of critical and non-critical processes, software and hardware. In addition, the EMS may provide an administrative interface to startup/stop/restart the AGCF and provide an audit trail for all administrative activities. The EMS may provide permissions based access and have levels including administration, read only and limited write only access. Furthermore, the EMS may manage multiple geo-diverse AGCFs which are located in various network subnets.

According to example embodiments, the EMS may be fault tolerant and be highly available. Further, the EMS may utilize SNMP for traps and alarms. The EMS may provide a way to represent NCS and SIP registration line status per subscriber gateway line. As an example, the EMS may represent NCS and registration progress of all subscribers or a group of subscriber DNs. As an example, a group of subscriber domain names filter may be based on domain name wildcard match. The EMS may provide de-activation and activation of SIP registration to IMS core per subscriber gateway line.

Thus, according to example embodiments, NCS protocol conversion to SIP may occur in the IMS network. Conventionally, registration does not occur on softswitches in an NCS environment. However, according to example embodiments, registration with AGCF allows IMS to provide user availability and capability and also plays a role in geo and local redundancy and in audit failure situations. Additionally, cable operators may prove SIP interoperability once user equipment is connected to the network as most NCS cable modems are certified. Thus, re-certification of cable modems and complexity related to MIB (management information base) configuration is inapplicable.

According to embodiments, emulation services may be provided in SIP on behalf of NCS legacy devices. For example, three-way conferencing may be provided in the network instead of on the device. AGCF uniquely manipulates logic by sending conference URIs. Conventionally, this was accomplished in the device, but this is helpful by providing transcoding with other codecs not supported by the NCS cable modem. This also provides N-way conference calling where RTP mixing may be performed by the network. The AGCF may subscribe to a registration event and determine whether to play specific tone files for any network based features (call forwarding, call hold, etc.). The AGCF may trigger appropriate signaling procedures for flash-hook events to initiate call and mid-call SIP messages. Mid-call services may include features such as call waiting, inquire/transfer calls, call park, three party call, etc. As an example, a mid-call service may include flash hook. An MWI pending status for a stutter dial tone may be based on a voicemail notification. AGCF may keep the MWI pending status until a 0 is received through voicemail. According to example embodiments, feature transparency is provided in PacketCable 2.0 and backward compatibility is provided to the PacketCable 1.0 infrastructure.

A user of the AGCF-based system will be provided with access to next-generation networking via a seamless user experience. This seamless user experience is a result of redundancy service availability which is provided by geo-redundancy. In addition, the user experience includes joined services provided by the cable modem that are not provided by NCS such as one-number services and over-the-top (OTT) mobile applications which may function as a secondary telephone line but still present a primary caller id. Redundancy for NCS cable modems may continue to provide services if a particular CMS is out of service (OOS). In addition, according to example embodiments, a pro-active audit for OOS NCS endpoints may be provided as well as deregistration in the IMS network.

Furthermore, simultaneous services in a hybrid network carrying both SIP and NCS call dialogue is possible through use of next-generation voice features along with the NCS cable modem through use of the AGCF. Conventionally, this was possible only through a SIP-based network.

Figure 4:
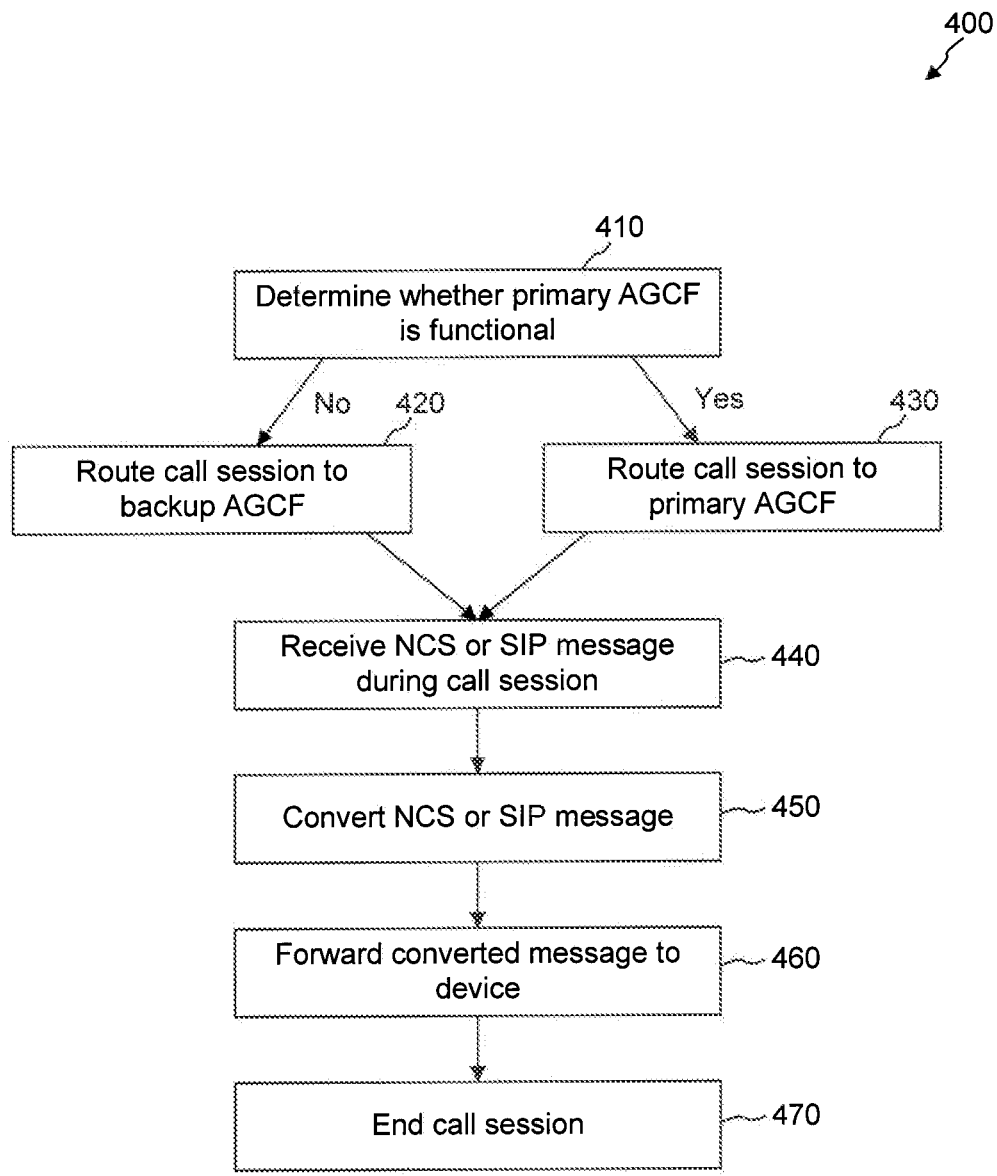
FIG. 4 illustrates a method of converting between NCS messages and SIP messages according to example embodiments.

According to embodiments, FIG. 4 illustrates a method of converting between NCS and SIP 400 according to example embodiments. In step 410, it is determined whether the primary access gateway control protocol (AGCF) server is functional. If the primary AGCF is not functional, then a call session may be routed to a backup AGCF in step 420. However, if the primary AGCF is functional, then a call session may be routed to the primary AGCF in step 430. In step 440, the acting AGCF may receive either an NCS or SIP message from a transmitting device. In step 450, the AGCF may convert the NCS message to a SIP message or convert the SIP message to an NCS message. In step 460, the converted message is forwarded to a receiving device. After the call session is over, in step 470, the call session is ended.

PacketCable Controller System Components and Example Computer System

Figure 5:
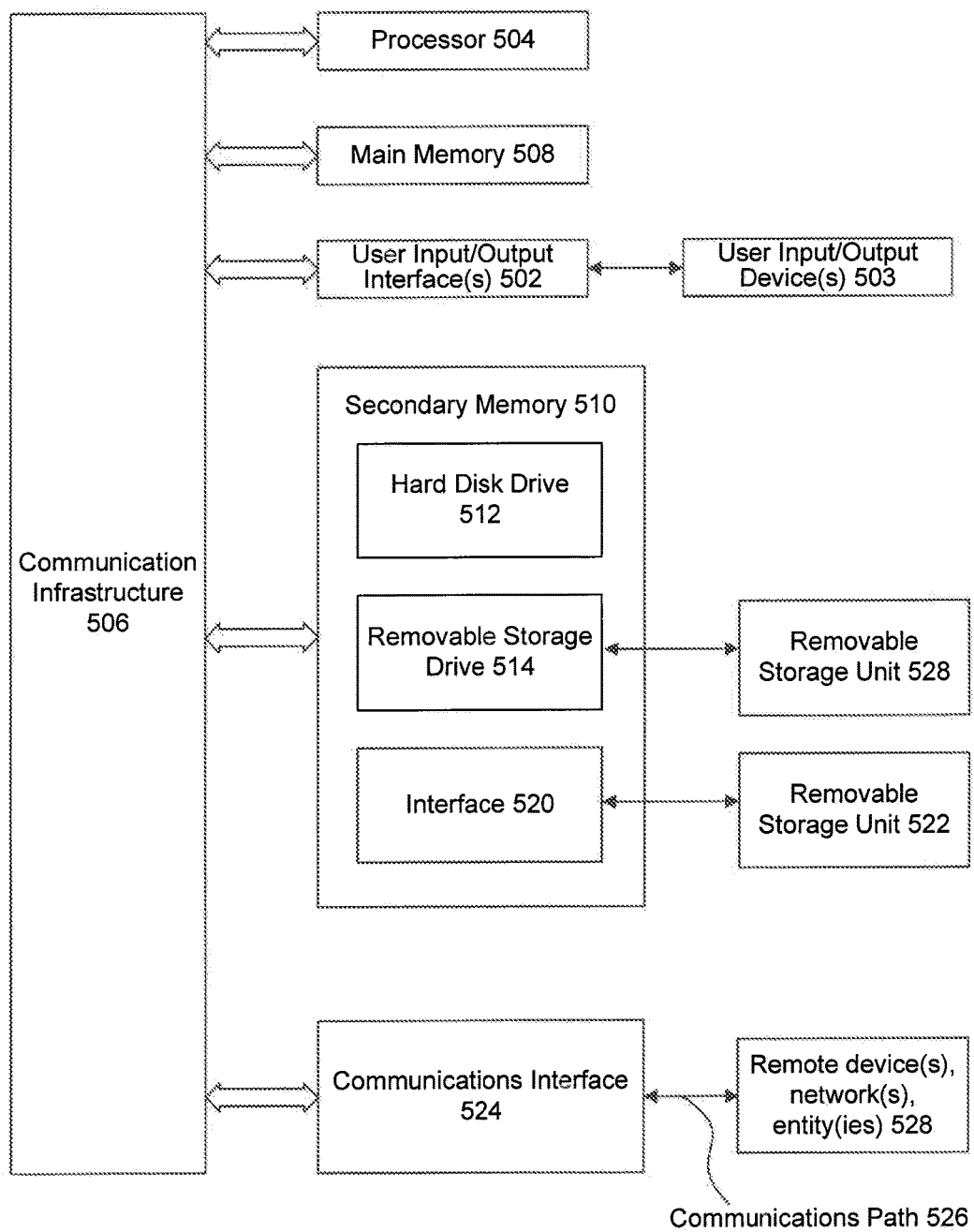
FIG. 5 is a diagram of an example computer system that can be used in embodiments.
Figure 6:
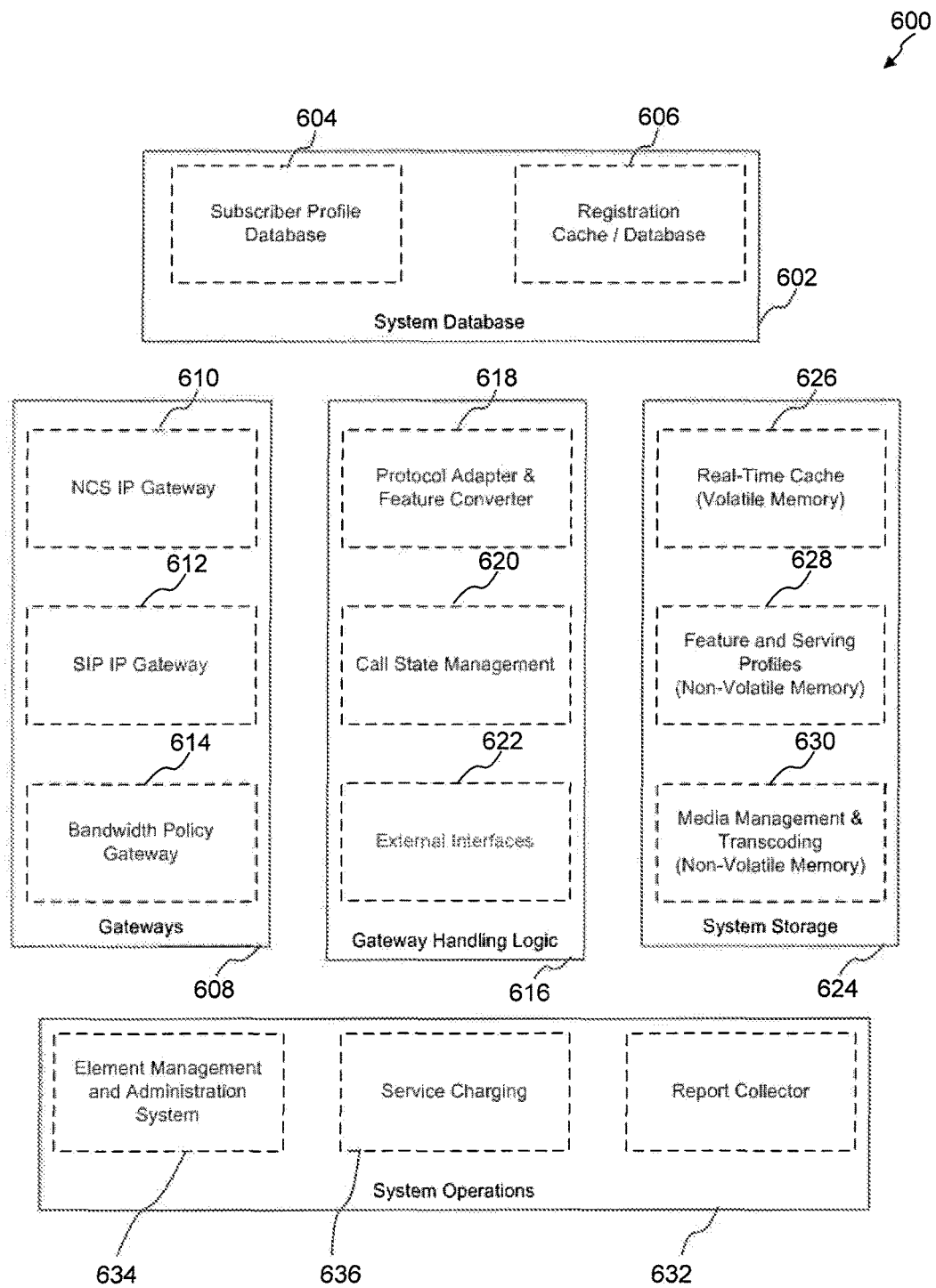
FIG. 6 illustrates a block diagram of components for a PacketCable controller system, according to example embodiments.

FIG. 5 is a diagram of an example computer system 500 that can be used in embodiments. FIG. 6 illustrates a block diagram 600 of a PacketCable controller system, according to example embodiments. This PacketCable controller system in FIG. 6 shows a functional abstraction of the example systems shown in FIGS. 1, 2A, 2B, and 3. According to example embodiments, the components described herein may include a system database 602, which may include a subscriber profile database 604 and a registration cache/database 606. In addition, the components may include gateways 608, which may include an NCS IP gateway 610, a SIP IP gateway 612, and a bandwidth policy gateway 614. The components may further include gateway handling logic 616, which may include a protocol adapter & feature converter 618, call state management 620, and external interfaces 622. Additionally, the components may include system storage 624, which may include a real-time cache (volatile memory) 626, feature and serving profiles (non-volatile memory) 628, and media management & transcoding (non-volatile memory) 630. Furthermore, the components may include system operations 632 which may include element management and administration system 634, service charging 636, and report collector 638.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   (a) beginning a call session between a first device and a second device;
   (b) receiving in a first access gateway control function server, a first session initiation protocol (SIP) message sent from the first device;
   (c) synchronizing voice calling feature data between the first access gateway control function server and a telephony application server;
   (d) converting the first SIP message in the first access gateway control function server to a first network-based call signaling (NCS) message to be received by the second device, wherein the converting in the first access gateway control function server comprises:
      (i) determining a voice calling feature in the first SIP message, wherein the voice calling feature is provided by the telephony application server and is selected using the first device; and
      (ii) converting the voice calling feature in the first SIP message into the first NCS message such that the voice calling feature is presentable to the second device;
   (e) transmitting the first NCS message including the voice calling feature to the second device;
   (f) determining that the first access gateway control function server has failed;
   (g) routing the call session to a second access gateway control function server, wherein the routing prevents disruption to the call session; and
   (h) ending the call session between the first device and the second device.

2. The method of claim 1, further comprising:
   (i) providing an interface between the first access gateway control function server and a proxy call session control function server.

3. The method of claim 1, further comprising:
   (i) providing an interface between the first access gateway control function server and a serving/interrogating call session control function server.

4. The method of claim 1, further comprising:
   (i) receiving in the first access gateway control function server, a second network-based call signaling (NCS) message sent from the second device; and
   (i) converting the second network-based call signaling (NCS) message in the first access gateway control function server to a second session initial protocol (SIP) message to be received by the first device.

5. The method of claim 1, wherein the second access gateway control function server is located at a same location as the first access gateway control function server.

6. The method of claim 1, wherein the second access gateway control function server is located at a different location from the first access gateway control function server.

7. The method of claim 2, further comprising:
   (i) emulating the first device to appear as SIP user equipment connecting to the proxy call session control function server through the first access gateway control function server.

8. A system, comprising:
a memory; and
at least one processor coupled to the memory and configured to:
(a) begin a call session between a first device and a second device;
(b) receive in a first access gateway control function server, a first session initiation protocol (SIP) message sent from the first device; and
(c) synchronize voice calling feature data between the first access gateway control function server and a telephony application server;
(d) convert the first SIP message in the first access gateway control function server to a first network-based call signaling (NCS) message to be received by the second device, wherein to convert the first SIP message, the at least one processor is further configured to:
(i) determine a voice calling feature in the first SIP message, wherein the voice calling feature is provided by the telephony application server and is selected using the first device; and
(ii) convert the voice calling feature in the first SIP message into the first NCS message such that the voice calling feature is presentable to the second device;
(e) transmit the first NCS message including the voice calling feature to the second device;
(f) determine that the first access gateway control function server has failed;
(g) route the call session to a second access gateway control function server, wherein the routing prevents disruption to the call session; and
(h) end the call session between the first device and the second device.

9. The system of claim 8, the at least one processor further configured to:
(i) provide an interface between the first access gateway control function server and a proxy call session control function server.

10. The system of claim 8, the at least one processor further configured to:
(i) provide an interface between the first access gateway control function server and a serving/interrogating call session control function server.

11. The system of claim 8, the at least one processor further configured to:
(i) receive in the first access gateway control function server, a second network-based call signaling (NCS) message sent from the second device; and
(i) convert the second network-based call signaling (NCS) message in the first access gateway control function server to a second session initial protocol (SIP) message to be received by the first device.

12. The system of claim 8, wherein the second access gateway control function server is located at a same location as the first access gateway control function server.

13. The system of claim 8, wherein the second access gateway control function server is located at a different location from the first access gateway control function server.

14. The system of claim 9, the at least one processor further configured to:
(i) emulate the first device to appear as SIP user equipment connecting to the proxy call session control function server through the first access gateway control function server.

15. A non-transitory computer-readable device having instructions stored thereon that, when executed by at least one computing device, causes the at least one computing device to perform operations comprising:
(a) beginning a call session between a first device and a second device;
(b) receiving in a first access gateway control function server, a first session initiation protocol (SIP) message sent from the first device;
(c) synchronizing voice calling feature data between the first access gateway control function server and a telephony application server;
(d) converting the first SIP message in the first access gateway control function server to a first network-based call signaling (NCS) message to be received by the second device, wherein the converting in the first access gateway control function server comprises:
(i) determining a voice calling feature in the first SIP message, wherein the voice calling feature is provided by the telephony application server and is selected using the first device; and
(ii) converting the voice calling feature in the first SIP message into the first NCS message such that the voice calling feature is presentable to the second device;
(e) transmitting the first NCS message including the voice calling feature to the second device;
(f) determining that the first access gateway control function server has failed;
(g) routing the call session to a second access gateway control function server, wherein the routing prevents disruption to the call session; and
(h) ending the call session between the first device and the second device.

16. The method of claim 1, wherein step (d) further comprises:
(iii) determining, using a user profile stored in the first access gateway control function server, whether the voice calling feature can be processed by the second device; and
(iv) based on the determining whether the voice calling feature can be processed by the second device, proceeding with converting the voice calling feature.

17. The method of claim 1, wherein step (d) further comprises:
(iii) incorporating a distinctive ring tone into the first NCS message, wherein the distinctive ring tone is associated with the voice calling feature.

18. The method of claim 1, wherein the voice calling feature is selected by a user using the first device.

* * * * *